(12) United States Patent
Machida et al.

(10) Patent No.: US 8,959,703 B2
(45) Date of Patent: Feb. 24, 2015

(54) WIPER BLADE

(75) Inventors: Ken Machida, Kiryu (JP); Masaru Fujiwara, Kiryu (JP); Ryu Ikezawa, Kiryu (JP); Jun Abe, Kiryu (JP); Yasuo Ohashi, Yokohama (JP); Mineya Fukushi, Yokohama (JP); Yukiho Murata, Yokohama (JP)

(73) Assignee: Mitsuba Corporation, Kiryu-shi, Gunma (JP)

( * ) Notice: Subject to any disclaimer, the term of this patent is extended or adjusted under 35 U.S.C. 154(b) by 1981 days.

(21) Appl. No.: 11/629,739

(22) PCT Filed: Jun. 17, 2005

(86) PCT No.: PCT/JP2005/011159
§ 371 (c)(1),
(2), (4) Date: Jan. 29, 2007

(87) PCT Pub. No.: WO2005/123471
PCT Pub. Date: Dec. 29, 2005

(65) Prior Publication Data
US 2007/0204422 A1    Sep. 6, 2007

(30) Foreign Application Priority Data

Jun. 18, 2004 (JP) ................. 2004-180980
Nov. 9, 2004 (JP) ................. 2004-325348

(51) Int. Cl.
*B60S 1/38* (2006.01)

(52) U.S. Cl.
CPC ............. *B60S 1/3893* (2013.01); *B60S 1/38* (2013.01); *B60S 2001/3812* (2013.01); *B60S 2001/382* (2013.01); *B60S 2001/3822* (2013.01)
USPC ................... 15/250.43; 15/250.361

(58) Field of Classification Search
USPC .......... 15/250.43, 250.44, 250.452, 250.361, 15/250.451, 250.48, 250.201
See application file for complete search history.

(56) References Cited

U.S. PATENT DOCUMENTS

| 6,161,248 A | 12/2000 | Merkel et al. ............ 15/250.32 |
| 2004/0111820 A1* | 6/2004 | Aoyama et al. .......... 15/250.201 |
| 2004/0250369 A1 | 12/2004 | Matsumoto et al. ..... 15/250.201 |

FOREIGN PATENT DOCUMENTS

| DE | 33 39 414 A1 | 5/1985 |
| DE | 3339414 | * 5/1985 |

(Continued)

OTHER PUBLICATIONS

Office Action and English Translation issued for Chinese Application No. 200580019949.5 dated Dec. 12, 2008.

(Continued)

*Primary Examiner* — Gary Graham
(74) *Attorney, Agent, or Firm* — McCormick, Paulding & Huber LLP

(57) ABSTRACT

A wiper blade 11 linked to a wiper arm 14 has a blade rubber 16 and a rubber holder 15 with a U-shaped section, wherein the rubber holder 15 is formed shorter in axial length than the blade rubber 16 and surrounds an intermediate portion of the blade rubber 16. Both end portions in a longitudinal direction of the rubber holder 15 are provided with a pair of holding portions 31 and 32, wherein the holding portion 31 has a holding claw 33 engaged with a stopper portion 36 provided in a holding groove 35 of the blade rubber 16 and the holding portion 32 has a holding claw 37 engaged slidably with the holding groove 35 of the blade rubber 16 and the rubber holder 15 is linked to the blade rubber 16 by two position of these holding portions 31 and 32.

12 Claims, 13 Drawing Sheets

(56) References Cited

FOREIGN PATENT DOCUMENTS

| | | |
|---|---|---|
| DE | 197 25 083 A1 | 6/1997 |
| DE | 10036115 A1 | 1/2003 |
| EP | 0646507 A2 | 4/1995 |
| EP | 1541433 A1 | 6/2005 |
| GB | 1 403 970 A | 8/1975 |
| JP | 63-196765 | 12/1988 |
| JP | 5-6216 | 2/1993 |
| JP | 9-221006 | 8/1997 |
| JP | 2000-503280 | 3/2000 |
| JP | 2003-312451 | 11/2003 |
| JP | 2005-22632 | 1/2005 |
| JP | 2005-59644 | 3/2005 |
| WO | 2004012967 A1 | 2/2004 |

OTHER PUBLICATIONS

European Search Report for EP 05751497 dated Sep. 29, 2008.
Communication issued by the European Patent Office on Oct. 7, 2010.

* cited by examiner

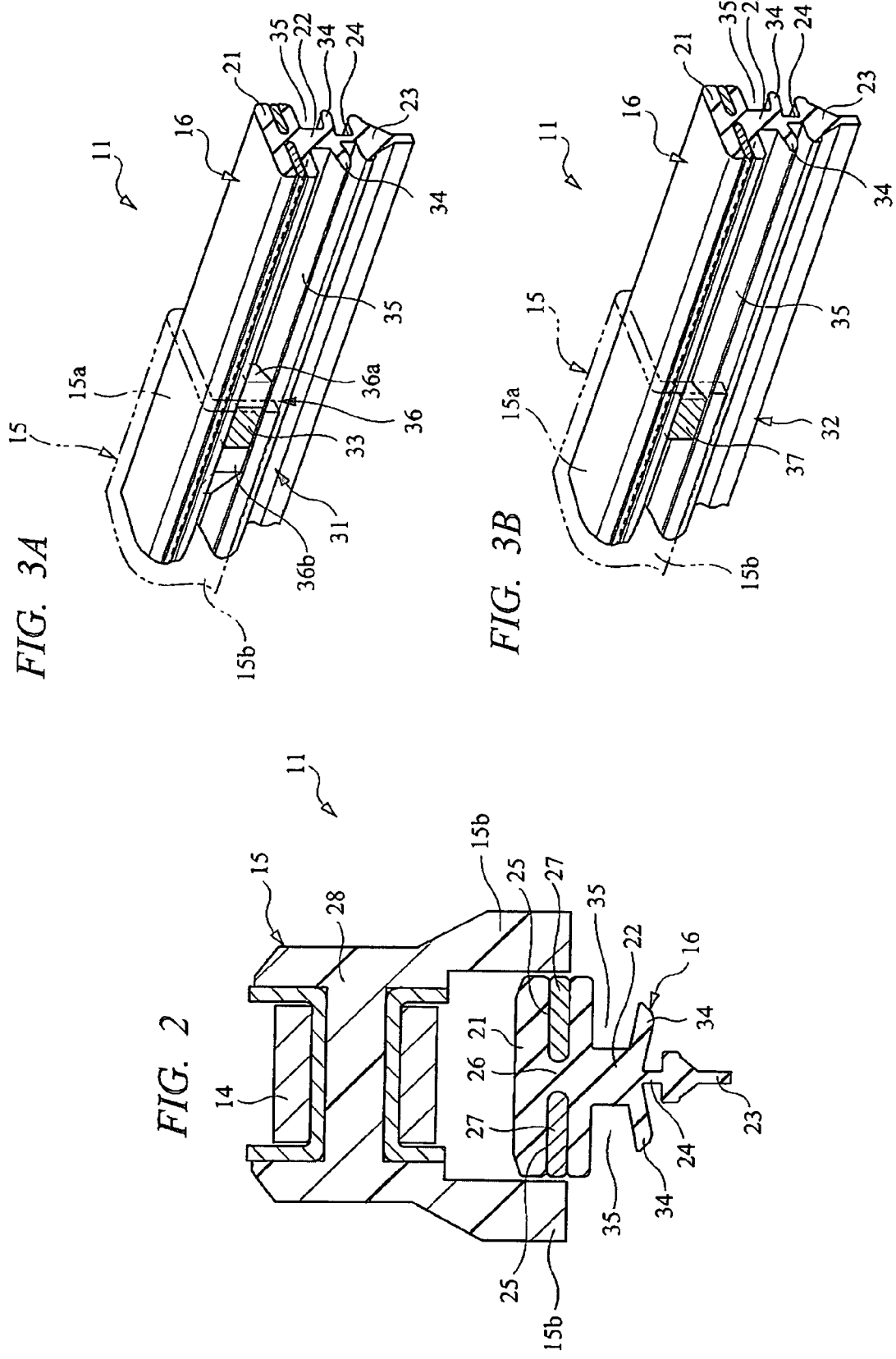

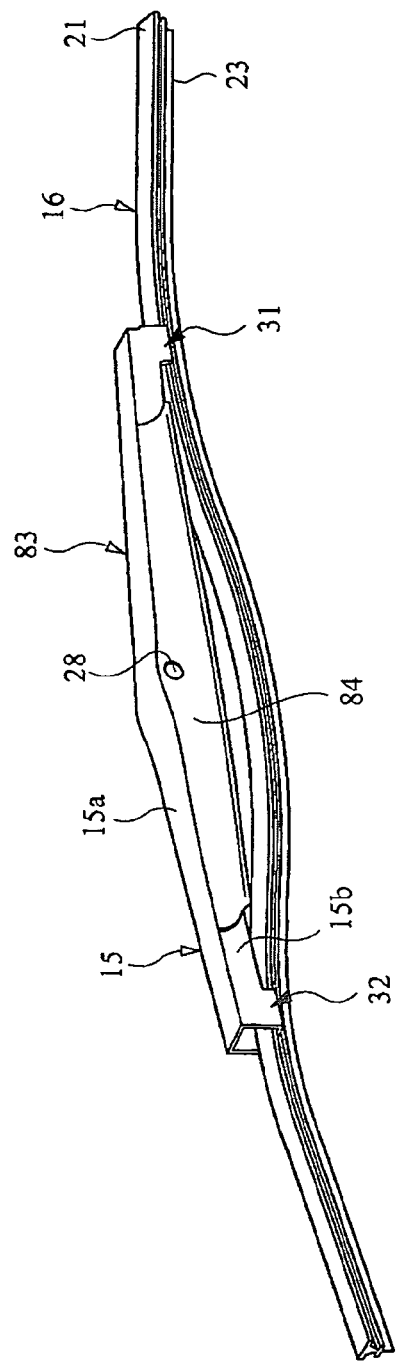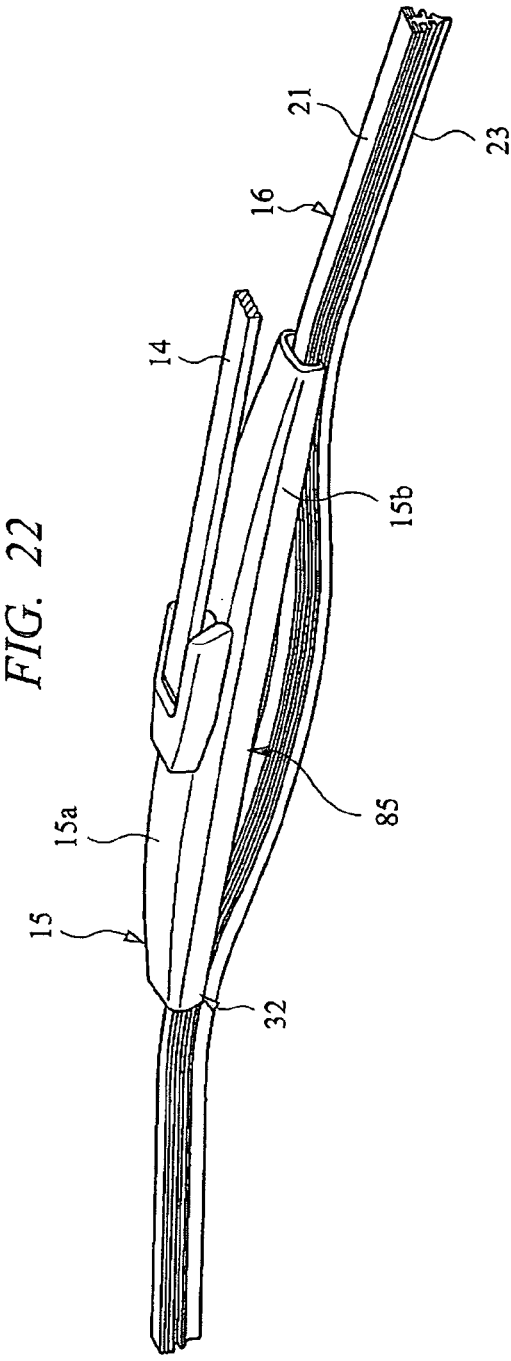

WIPER BLADE

CROSS-REFERENCE TO RELATED APPLICATIONS

This application is entitled to the benefit of and incorporates by reference essential subject matter disclosed in International Patent Application No. PCT/JP2005/011159 filed on Jun. 17, 2005; Japanese Patent Application No. 2004-180980 filed on Jun. 18, 2004; and Japanese Patent Application No. 2004-325348 filed on Nov. 9, 2004.

TECHNICAL FIELD

The present invention relates to a wiper blade that is attached to a wiper arm of a vehicle to wipe a windshield glass of the vehicle.

BACKGROUND ART

In general, among wiper apparatuses provided to vehicles, there is a structure in which a wiper blade is lined to an intermediate portion in a longitudinal direction of a wiper arm, the wiper blade comprising: a wiper blade including a blade rubber at a tip of which a lip portion for wiping a windshield surface is provided; and a blade spring member provided to a head portion of the blade rubber and is biased so that the lip portion closely contacts with the windshield surface. As such, in the case where the wiper blade is linked to one position in a longitudinal direction of the wiper arm, a windshield-surface pressing force of the wiper blade that the wiper arm has is dispersed via a connection portion of the wiper blade to both end portions in the longitudinal direction. Accordingly, as reaching an end portion when the connection portion of the wiper arm to the wiper blade is set as a reference, the windshield-surface pressing force by the wiper arm becomes smaller and thus becomes uneven, which results in a problem of wiping unevenness.

To solve this problem, there has been proposed a structure in which the blade rubber is linked to the wiper arm via a rubber holder (yoke) linked to two positions in the longitudinal direction of the blade rubber, whereby the pressing force of the wiper arm is exerted onto the two positions of the blade rubber to increase the pressing force applied to both end portions in the longitudinal direction of the wiper arm.

Patent Document 1: Japanese Utility Model No. 5-6216

DISCLOSURE OF THE INVENTION

However, a conventional structure as described above has a structure in which two connecting portions between the rubber holder and the blade rubber are used as pivot connection portions, specifically in which, at two positions in the longitudinal direction of a main body member constituting the wiper blade, pin shafts supported by the connecting portions protruding in a direction away from the windshield surface are inserted into long holes formed in the connecting portions of the rubber holder. And, the pressing force to press the wiper blade to the windshield surface by a biasing spring provided to the wiper arm is transmitted to the blade rubber via the pin shaft positioned at a location farther from the windshield surface than the main body member. For this reason, the pressing force by the wiper arm reaches the blade rubber via the main body member, and an oscillation supporting point is present on an outer side rather than the main body member, which results in deterioration of an adhesion property of the blade rubber to the windshield surface. Therefore, there is a problem of low wiping performance at both ends of the wiper blade. Further, in this structure, a long gap is formed between the blade rubber and the rubber holder in a blade-length direction, and accordingly there is a problem of deterioration of its design characteristic.

Furthermore, the above has a structure in which the rubber holder and the blade rubber are linked separately at two positions, so that there is also the problem that its connection work becomes complicated and troublesome. These problems are objects to be solved by the present invention.

A wiper blade according to the present invention is one for wiping a windshield glass of a vehicle and comprises: a blade rubber having a lip portion that wipes a surface of the windshield glass, a head portion in which a pair of mounting grooves are formed and that is linked to the lip portion via a neck portion, and a pair of holding grooves that are provided between the lip portion and the head portion and each of which is provided a stopper portion; a pair of blade spring members that have elasticity and are respectively mounted in the mounting grooves of the blade rubber; and a rubber holder that has a pair of side wall portions and a top wall portion linked mutually to the side wall portions, and holds the blade rubber by a pair of holding portions that have a pair of holding claws provided respectively in the side wall portions and disposed in the holding grooves, wherein an axial length of the rubber holder is formed so as to be shorter than that of the blade rubber, an intermediate portion of the head portion of the blade rubber is surrounded by the rubber holder, and the pair of holding claws of one of the holding portions are disposed in the pair of stopper portions, respectively.

A wiper blade according to the present invention is one for wiping a windshield glass of a vehicle and comprises: a blade rubber having a lip portion that wipes a surface of the windshield glass, a head portion in which a pair of mounting grooves are formed and that is linked to the lip portion via a neck portion, and a pair of holding grooves that are provided between the lip portion and the head portion and each of which is provided a stopper portion; a pair of blade spring members that have elasticity and are respectively mounted in the mounting grooves of the blade rubber; and a rubber holder that has a pair of side wall portions and a top wall portion linked mutually to the side wall portions, and holds the blade rubber by a pair of holding portions that have a pair of holding claws provided respectively in the side wall portions and disposed in the holding grooves, wherein an axial length of the rubber holder is formed so as to be shorter than that of the blade rubber, an intermediate portion of the head portion of the blade rubber is surrounded by the rubber holder and the respective stopper portions are formed by a pair of convex portions that protrude in the holding grooves, and the pair of holding claws of one of the holding portions are disposed between the pair of convex portions of the respective corresponding stopper portions.

A wiper blade according to the present invention is one for wiping a windshield glass of a vehicle and comprises: a blade rubber having a lip portion that wipes a surface of the windshield glass, a head portion in which a pair of mounting grooves are formed and that is linked to the lip portion via a neck portion, and a pair of holding grooves that are provided between the lip portion and the head portion and each of which is provided a stopper portion; a pair of blade spring members that have elasticity and are respectively mounted in the mounting grooves of the blade rubber; and a rubber holder that is formed into a U-shaped section having a pair of side wall portions and a top wall portion linked mutually to the side wall portions, and holds the blade rubber by a pair of holding portions that have a pair of holding claws provided respectively in the side wall portions and disposed in the holding grooves, wherein an axial length of the rubber holder is formed so as to be shorter than that of the blade rubber, an intermediate portion of the head portion of the blade rubber is surrounded by the rubber holder, and the pair of holding claws of one of the holding portions are disposed in the pair of stopper portions, respectively.

A wiper blade according to the present invention is one for wiping a windshield glass of a vehicle and comprises: a blade rubber having a lip portion that wipes a surface of the windshield glass, a head portion in which a pair of mounting grooves are formed and that is linked to the lip portion via a neck portion, and a pair of holding grooves that are provided between the lip portion and the head portion and each of which is provided a stopper portion; a pair of blade spring members that have elasticity and are respectively mounted in the mounting grooves of the blade rubber; a rubber holder that has a pair of side wall portions and a top wall portion linked mutually to the side wall portions and an axial length of which is formed shorter than that of the blade rubber to surround an intermediate portion of the head portion of the blade rubber; first connecting means that has a pair of first holding claws provided respectively to the side wall portions and which links the blade rubber and the rubber holder by the first holding claws being disposed in the stopper portions; and second connecting means that has a pair of second holding claws provided respectively to the side wall portions and which links the blade rubber and the rubber holder by the second holding claws being disposed in the holding grooves.

The wiper blade according to the present invention further comprises: caps mounted respectively on both tip portions in a longitudinal direction of the blade rubber and holding in the mounting grooves both tip portions in a longitudinal direction of the pair of blade spring members, wherein engaging portions of the caps are engaged with engaged portions formed in the holding grooves of the blade rubber to fix the caps to the blade rubber.

The wiper blade according to the present invention is such that concave grooves formed so as to be dented toward a wiping direction of the blade rubber are provided in the holding grooves, and engaging protrusions that are engaged with the concave grooves are provided to the caps.

The wiper blade according to the present invention is such that an abutment portion that abuts on a bottom surface of each of the caps is provided to a tip portion of the blade rubber.

The wiper blade according to the present invention is such that a cover swingable in a direction perpendicular to the windshield glass with respect to the rubber holder is provided between the rubber holder and each of the caps.

According to the present invention, a structure of the wiper blade can be simplified, assembling work of the blade rubber into the rubber holder can be made easy, and further an excellent designing property can be obtained since the intermediate portion in the longitudinal direction of the head portion of the blade rubber is surrounded by the rubber holder. Also, it is possible to improve a following property of the wiper blade with respect to the windshield glass.

Further, according to the present invention, it is possible to prevent the blade spring member from being detached from the mounting groove by the cap. Furthermore, the engaging portion of the cap is engaged with the engaged portion formed in the blade rubber to fix the cap to the blade rubber, so that even in the case where distortion of the blade rubber occurs due to an wiping action and the like, engagement between the cap and the blade rubber remains tight. Therefore, it is possible to prevent the cap from being detached from the blade rubber. Moreover, since the cap is engaged with the blade rubber, it is possible to detachably attach the cap to the blade rubber by elasticity of the blade rubber.

Still further, according to the present invention, the concave groove is formed in the engaged portion of the blade rubber and the engaging protrusion is formed in the engaging portion of the cap, so that the cap can be easily fixed to the blade rubber only by pressing the cap into the blade rubber.

Furthermore, according to the present invention, the abutment portion that abuts on the cap is provided at the tip portion of the blade rubber, so that the tip portion of the blade rubber is reinforced by this abutment portion, whereby it is possible to prevent the tip portion of the blade rubber from being damaged.

Moreover, according to the present invention, since the cover is mounted between the rubber holder and the cap, it is possible to increase a sense of togetherness of a shape from the rubber holder via the cover to the cap and enhance the excellent appearance of the wiper blade.

BRIEF DESCRIPTION OF THE DRAWINGS

FIG. 2 is a cross-sectional view taken along line A-A in FIG. 1;

FIG. 3A and FIG. 3B are each an explanatory diagram showing a detail of a holding portion of a rubber holder shown in FIG. 1;

FIG. 21 is a perspective view showing a modified example of the wiper blade shown in FIG. 1; and FIG. 22 is a perspective view showing a modified example of the wiper blade shown in FIG. 1.

BEST MODE FOR CARRYING OUT THE INVENTION

Hereinafter, embodiments of the present invention will be detailed with reference to the drawings.

Figure 1:
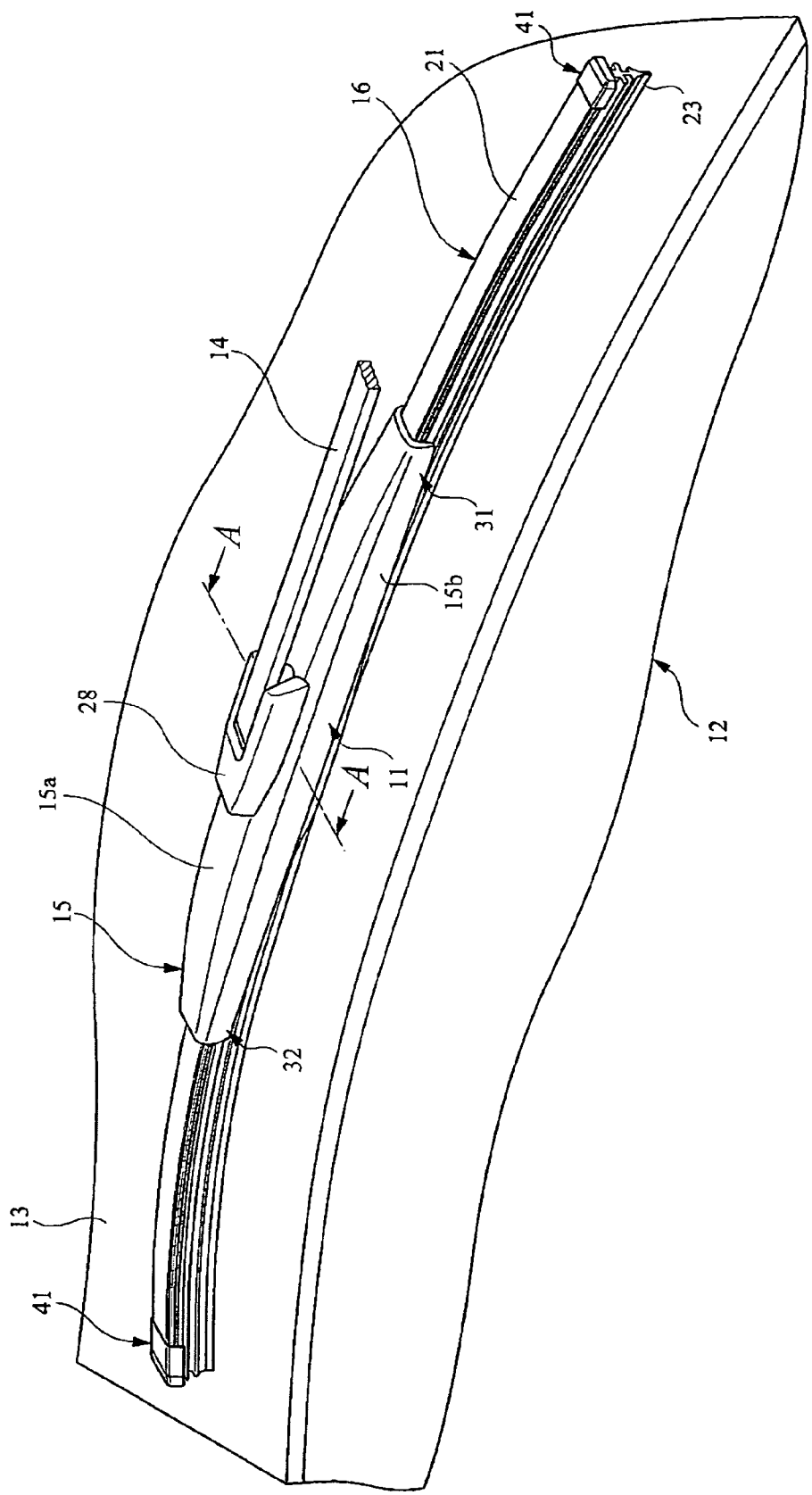
FIG. 1 is a perspective view showing a state of using a wiper blade according to a preferred embodiment of the present invention.

FIG. 1 is a perspective view showing a state of using a wiper blade according to a preferred embodiment of the present invention, and a wiper blade 11 shown in FIG. 1 is provided to wipe attachments, such as rain drops and droplets from a car traveling forward car and the like, adhering to a front windshield glass 13 (hereinafter referred to as windshield glass 13) of a vehicle 12.

This wiper blade 11 has a rubber holder 15 attached to a tip of a wiper arm 14 provided swingably to the vehicle 12, and a blade rubber 16 held by the rubber holder 15, wherein the blade rubber 16 resiliently contacts with the windshield glass 13 by a pressing force of the wiper arm 14 applied via the rubber holder 15. And, when the wiper arm 14 is driven by an unshown wiper motor, the wiper blade 11 together with the wiper arm 14 carries out a swinging movement on the windshield glass 13 and wipes the glass surface.

FIG. 2 is a cross-sectional view taken along line A-A in FIG. 1, and FIG. 3A and are each an explanatory diagram showing a detail of a holding portion of the rubber holder shown in FIG. 1.

As shown in FIG. 2, the blade rubber 16 used in this wiper blade 11 is made of a material such as natural rubber or synthetic rubber or the like, and is formed into a bar shape having a uniform section in a longitudinal direction, which has a head portion 21, and a connecting portion 22 and a lip portion 23 that continue into the head portion 21, so that the lip portion 23 contacts with the windshield glass 13. The lip portion 23 is linked to the connecting portion 22 via a neck portion 24 whose width in a wiping direction is formed narrower than those of the connecting portion 22 and the lip portion 23, whereby the lip portion 23 can be freely inclined in the wiping direction with respect to the head portion 21 and the connecting portion 22.

Mounting grooves 25 dented respectively in a wiping direction are formed at both wiping-directional sides of the head portion 21. These mounting grooves 25 are formed respectively so as to extend in a longitudinal direction to reach from one end in the longitudinal direction of the head portion 21 to the other end, and the respective mounting grooves 25 are arranged in the wiping direction in a state of being isolated from each other by a partition portion 26. And, blade spring members (vertebras) 27 are mounted respectively in these mounting grooves 25.

The blade spring member 27 is formed into a plane shape with a length dimension similar to that of the blade rubber 16 by punching and processing a plate material such as a steel plate, and becomes elastically deformable in a direction perpendicular to the windshield glass 13. Therefore, the blade rubber 16 in which the blade spring members 27 is mounted can be elastically deformed together with the blade spring members 27 in the direction perpendicular to the windshield glass 13, that is, in a direction of changing a curve degree with respect to the glass surface. Further, the blade spring member 27 in its natural state has a larger curvature than that of the windshield glass 13 in a direction of being elastically deformed freely, whereby the blade rubber 16 in which the blade spring members 27 is mounted is also curved more strongly than the windshield glass 13 in a state of being away from the windshield glass 13.

Incidentally, when illustrated in the drawings, the blade spring member 27 formed of a steel plate is employed. However, the present invention is not limited to this, and a blade spring member formed of, for example, a hard resin or the like may be employed or a blade spring member formed of such other materials as to be elastically deformable in the direction perpendicular to the windshield glass 13 may be employed.

On the other hand, the rubber holder 15 is made of a resin material and formed into a shape with a U-shaped section, and has a top wall portion 15a and a pair of side wall portions 15b linked to each other by the top wall portion 15a and expanding substantially parallel in the longitudinal direction, wherein an axially length dimension thereof is set around half of that of the blade rubber 16. An attaching portion 28 is provided at a substantially intermediate portion of the top wall portion 15a in the longitudinal direction, and the rubber holder 15 is attached to a tip of the wiper arm 14 by the attaching portion 28. When the blade rubber 16 is mounted on the rubber holder 15, an upper surface of the head portion 21 of the blade rubber 16 is covered with the top wall portion 15a of the rubber holder and left and right side surfaces (both side portions in the wiping direction) of the head portion 21 are covered with both side wall portions 15b in the longitudinal direction, that is, the intermediate portion of the head portion 21 of the blade rubber 16 in the longitudinal direction is surrounded by the rubber holder. Thereby, when the blade rubber 16 abuts on the windshield glass 13, since no gap expanding in the longitudinal direction between the rubber holder 15 and the blade rubber 16 is formed, the present invention has an excellent design property.

Incidentally, the rubber holder 15 is not limited to one made of a resin, and may be formed of a metal material or the like.

At one end in the longitudinal direction of the rubber holder 15 (end that is nearer to an oscillation center of the wiper arm 14 when the wiper blade 11 is attached to the wiper arm 14), a holding portion 31 is provided. At the other end in the longitudinal direction of the rubber holder 15, a holding portion 32 is provided.

As shown in FIG. 3A, the holding portion 31 as first connecting means has a pair of first holding claws 33 that are formed integrally with the side wall portions 15b respectively (hereinafter referred to as holding claws 33, and although one side only is illustrated in the drawings, the same holding claw 33 is provided also on the other side), and these holding claws 33 are formed into protruded shapes with rectangular sections, which protrude from the side wall portions 15b toward the direction perpendicular to the longitudinal direction of the blade rubber 16 and parallel with the wiping direction. On the other hand, between the head portions 21 and the lip portion 23 of the blade rubber 16, a pair of holding grooves 35 partitioned by the head portion 21 and an arm portion 34 formed in the connecting portion 22 are formed to expand in the longitudinal direction. The respective holding claws 33 are arranged in the respectively corresponding holding groove 35. That is, the head portion 21 of the blade rubber 16 is surrounded by the holding claws 33, the both side wall portions 15b, and the top wall portion 15a, whereby the head portion 21 is held by the holding portion 31.

Further, a pair of stopper portions 36 are provided in the blade rubber 16 so as to correspond to the holding grooves 35, respectively, and the holding claws 33 provided in the holding portions 31 are disposed at these stopper portions 36. As shown in FIG. 3A, the stopper portions 36 have a pair of convex portions 36a and 36b that protrude respectively in the holding grooves 35, and these convex portions 36a and 36b are spaced in the longitudinal direction per specified interval. The respective holding claws 33 of the holding portion 31 are arranged so as to be sandwiched between the pair of convex portions 36a and 36b of the stopper portion 36 corresponding to the holding claws, whereby a movement in a direction directed to the holding grooves 35 with respect to the blade rubber 16 is regulated. That is, the blade rubber 16 is linked to, namely, is held by the rubber holder 15 in a state of being positioned to the longitudinal direction in the holding portions 31.

In the same manner, as shown in FIG. 3B, the holding portion 32 as second connecting means has a pair of second holding claws 37 that are formed integrally with the side wall portions 15b respectively (hereinafter referred to as holding claws 37, and although one side only is illustrated in the drawings, the same holding claw 37 is provided also on the other side), and these holding claws 37 are formed into protruded shapes with rectangular sections, which protrude from the side wall portions 15b in the direction perpendicular to the longitudinal direction of the blade rubber 16 and parallel with the wiping direction. The respective holding claws 37 are arranged in the respectively corresponding holding grooves 35, whereby the head portion 21 of the blade rubber 16 is surrounded by the holding claws 37, the both side wall portions 15b, and the top wall portion 15a and is held by the holding portion 32. That is, stopper portions 35a and 36b are not provided at locations corresponding to the holding portion 32 of the holding grooves 35, and the blade rubber 16 is linked to, that is, held by the rubber holder 15 in a state where the holding claws 37 becomes movable along the holding grooves 35.

Figure 4A:
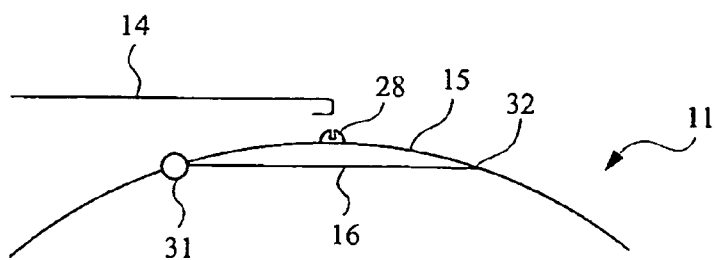
FIG. 4A through FIG. 4D are each an explanatory diagram showing a change in a shape of a blade rubber when the wiper blade shown in FIG. 1 contacts with a windshield glass.
Figure 4B:
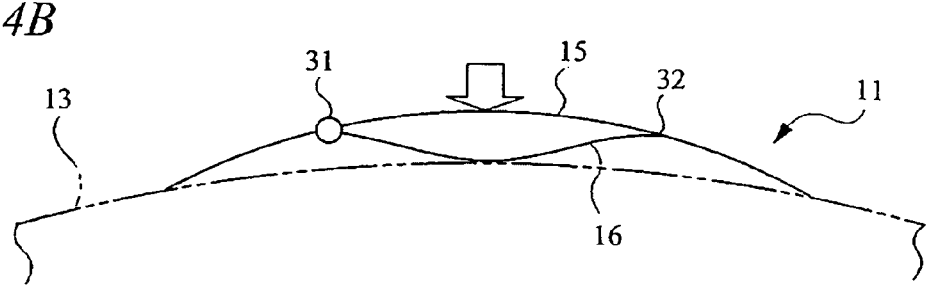
Figure 4C:
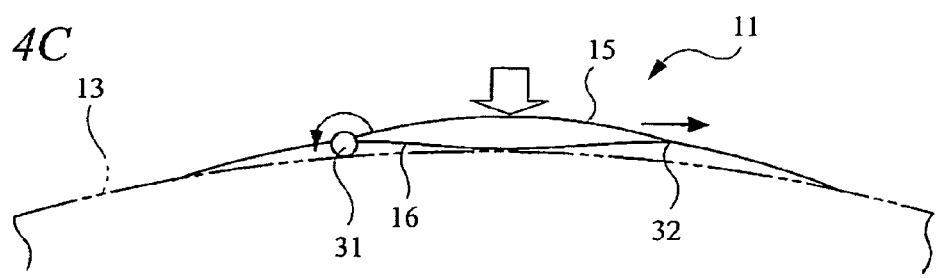
Figure 4D:
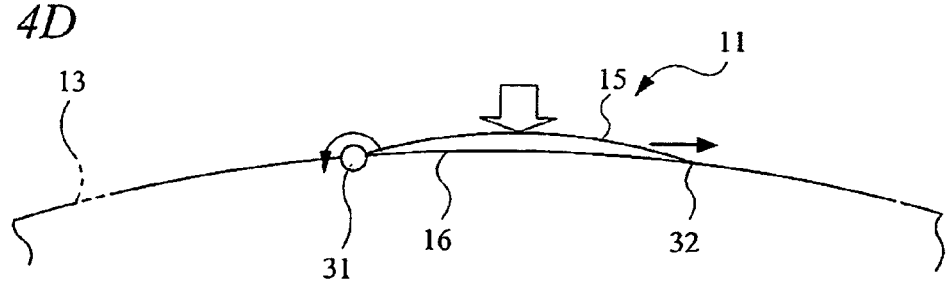

FIG. 4A through FIG. 4D are each an explanatory diagram showing a change in a shape of the blade rubber 16 when the wiper blade 11 shown in FIG. 1 contacts with the windshield glass 13. When the blade rubber 16 does not contact with the windshield glass 13, as shown in FIG. 4A, this wiper blade 11 is curved in a direction of being closed toward the glass surface with a further larger curvature than the maximum curvature within a wiping range of the windshield glass 13. When the wiper blade 11 is set to the windshield glass 13 from this state, first both end portions in the longitudinal direction of the blade rubber 16 contacts with the glass surface. In a state where both end portions of the blade rubber 16 contact with the glass surface, when a pressing force (shown by arrows in the drawings) of the wiper arm 14 is applied via the rubber holder 15 onto the blade rubber 16, as shown in FIG. 4B, the blade rubber 16 is deformed into an M-shape so that a center portion in the longitudinal direction contacts with the glass surface. At this time, the movement of the blade rubber 16 in the axial direction with respect to the rubber holder 15 is regulated at the holding portion 31, and the movement thereof in the axial direction is permitted at the holding portion 32, so that as the pressing force from the wiper arm 14 increases, the blade rubber 16 can be deformed along the glass surface. And, as shown in FIG. 4C, the blade rubber 16 is deformed so as to become gradually in a state of being along the glass surface. When being completely set to the glass surface, as shown in FIG. 4D, the blade rubber gets in a wiping position where the entire body thereof in the longitudinal direction contacts with the glass surface by the pressing force from the wiper arm 14. At this moment, the blade spring member 27 is also deformed elastically in such a shape as to be along the glass surface in the same manner as the blade rubber 16, so that the pressing force of the wiper arm 14 applied via the attaching portion 28 onto the rubber holder 15 is dispersed in the longitudinal direction of the blade rubber 16 by the elastic deformation of the blade spring member 27 and the blade rubber 16 contacts with the windshield glass 13 by a distribution pressure uniform in the longitudinal direction. Accordingly, it is possible to make the blade rubber 16 perform a wiping operation in a state where the entire body in the longitudinal direction of the blade rubber 16 contacts with the windshield glass 13 evenly and to bring out the preferred wiping property.

As described above, in this wiper blade 11, the blade rubber 16 is provided with the holding portions 31 and 32 at both end portions in the longitudinal direction of the rubber holder 15, wherein the blade rubber 16 is held at two points by these holding portions 31 and 32. Accordingly, when the pressing force from the wiper arm 14 is applied via the attaching portion 28 onto the rubber holder 15, the pressing force is applied from the two points of both end portions of the rubber holder 15, that is, from the respective holding portions 31 and 32 and both end portions of top wall portions 15a corresponding to the respective holding portions 31 and 32, to two portions on both sides among four positions divided in the longitudinal direction of the blade rubber 16 so that the respective portions have almost the same length (positions approximately ¼ of the full length away from the end portions of the blade rubber 16) and the pressing force is distributed evenly in the longitudinal direction from their two pressed positions. Accordingly, it is possible to resiliently press the blade rubber 16 to the windshield glass 13 with even distribution pressure, so that without changing, in the longitudinal direction, the plate thickness or width of the blade spring member 27 mounted on the blade rubber 16, the blade rubber 16 evenly onto the glass surface can be pressed. Further, since the blade rubber 16 is permitted to conduct a slide movement to the holding portion 32 on one side of the rubber holder 15, it is possible to apply further uniformly the pressing force of the blade rubber 16 onto the windshield glass 13. Furthermore, when the rubber holder 15 is externally fitted into the blade rubber 16 and the blade rubber 16 is slid in the longitudinal direction to the rubber holder 15, the blade rubber 16 can be incorporated into the rubber holder 15. Therefore, it is possible to simplify a structure of the wiper blade 11 and to easily perform assembling work to improve workability. Moreover, the rubber holder 15 is so incorporated to cover the blade rubber 16 from the outside, and when the blade rubber 16 contacts with the glass surface, no gap is formed between the rubber holder 15 and the blade rubber 16. Therefore, it is possible to enhance the design property, that is, beautiful appearance of the wiper blade 11.

Still further, in this wiper blade 11, since the blade rubber 16 is held by the holding claws 33 and 37 that are positioned nearer to the windshield glass 13 than the blade spring member 27, oscillation of the blade rubber 16 toward the glass surface is performed with a location nearer to the windshield glass 13 being used as a supporting shaft. Therefore, it is possible to improve an adhesion property of the blade rubber 16 to the windshield glass 13 and provide the wiper blade with excellent wiping performance as well as an excellent design property.

Furthermore, this wiper blade 11 has a structure assembled by the holding grooves 35 and the stopper portions 36 formed in the blade rubber 16 and by the pair of the holding claws 33 and 37 formed in the rubber holder 15, so that it is possible to simplify the structure of this wiper blade 11 and reduce the number of parts thereof.

Moreover, this wiper blade 11 has a structure in which the pair of the holding claws 33 and 37 are formed respectively in the side wall portions 15b of the rubber holder 15 and these are engaged with the holding grooves 35 formed on both sides in the wiping direction of the blade rubber 16. Therefore, even if distortion occurs in the blade rubber 16, the slide movement and oscillation action of the blade rubber 16 can be conducted smoothly, whereby the wiping property can be secured. Incidentally, the blade spring member 27 is not limited to one whose curvature is fixed in the longitudinal direction, and, in the state shown in FIG. 4A (natural state), the curvature of the blade spring member 27 may be made different in the longitudinal direction so that the portion located between both ends of the rubber holder 15 is difficult from the portion located outside both ends of the rubber holder 15.

Figure 5:
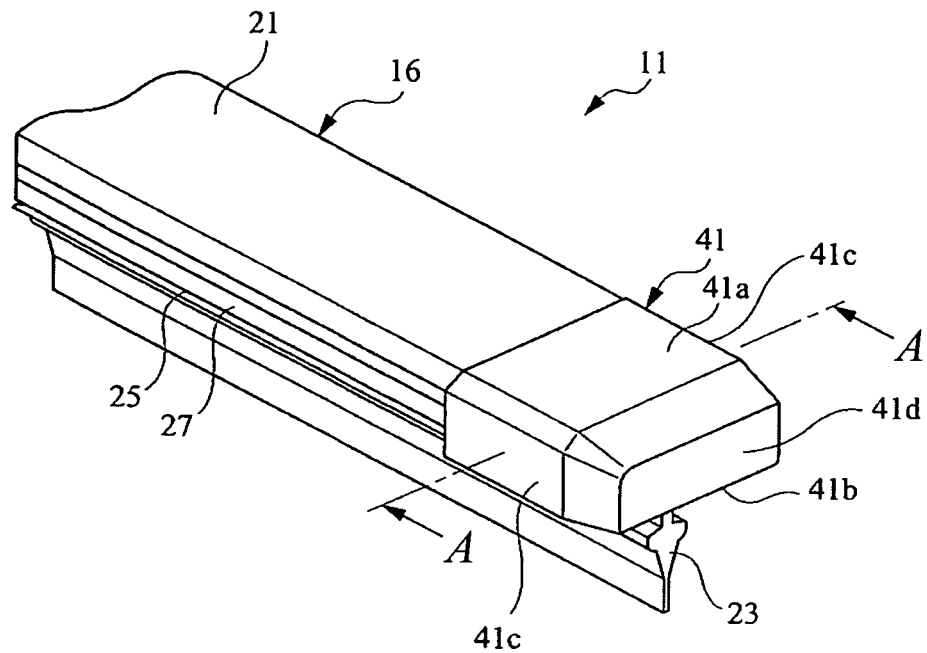
FIG. 5 is a perspective view showing a detail of a tip portion of the blade rubber shown in FIG. 1.
Figure 6:
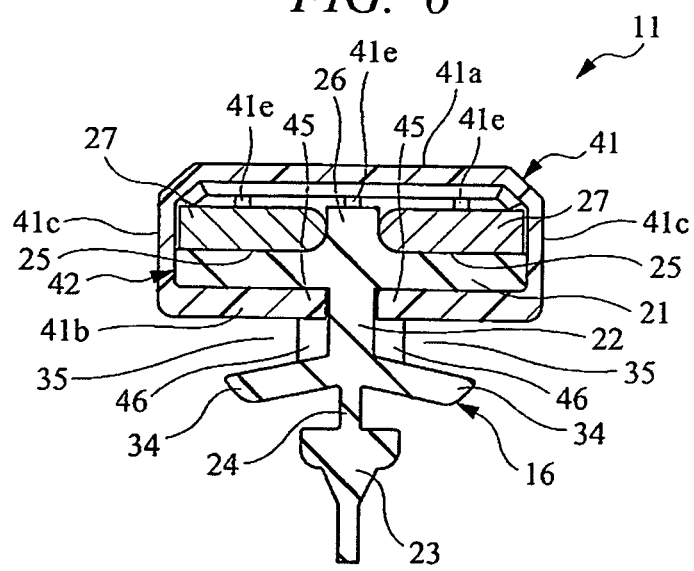
FIG. 6 is a cross-sectional view taken along line A-A in FIG. 5.
Figure 7:
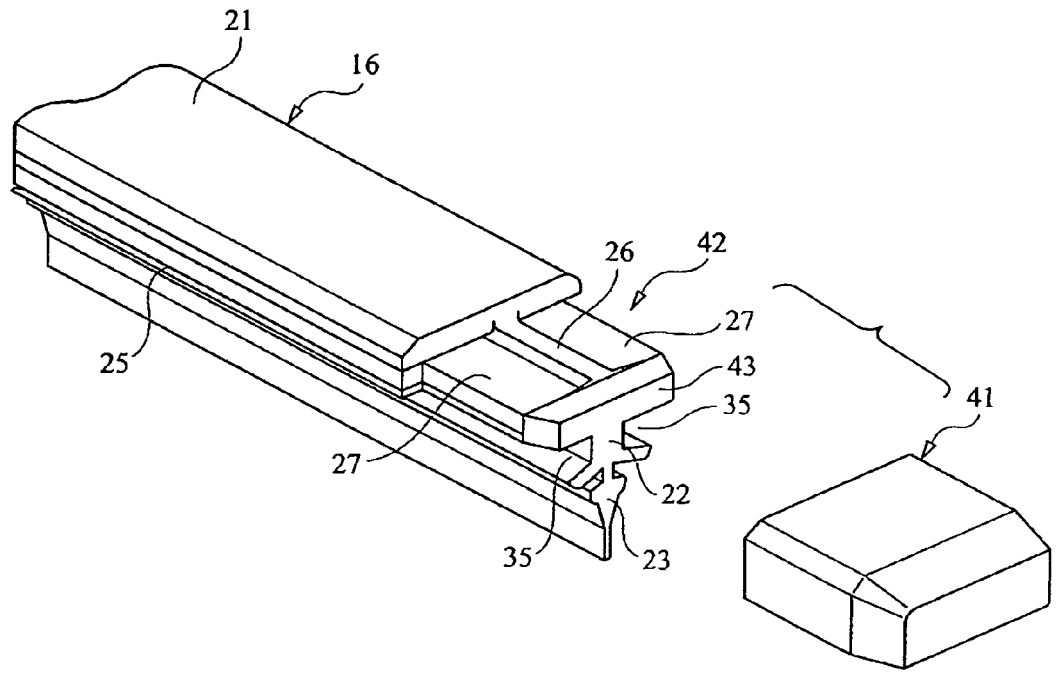
FIG. 7 is a broken perspective view showing a state of removing a cap shown in FIG. 5 from the blade rubber.
Figure 8:
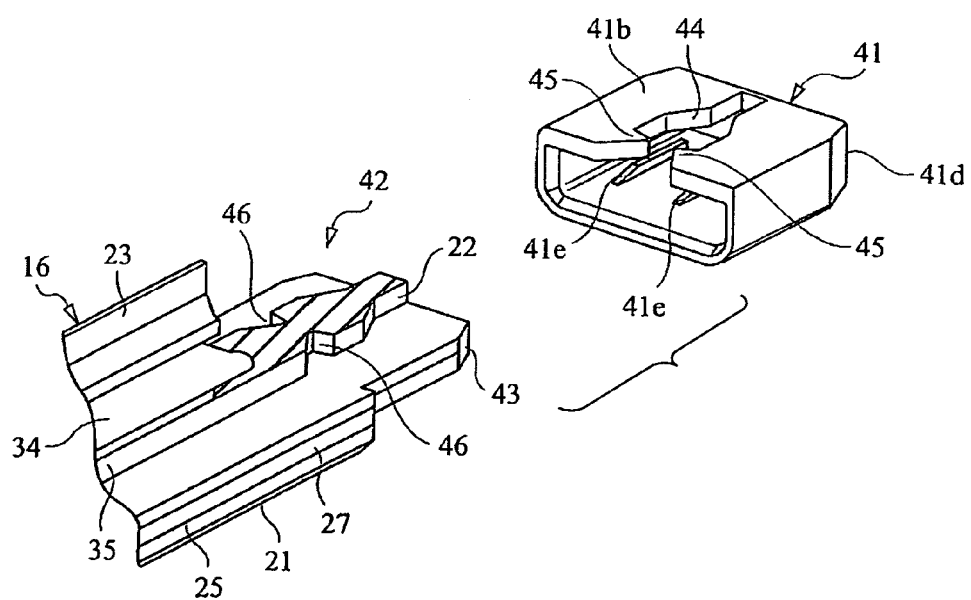
FIG. 8 is a broken perspective view showing a state of removing the cap shown in FIG. 5 from the blade rubber.
Figure 9A:
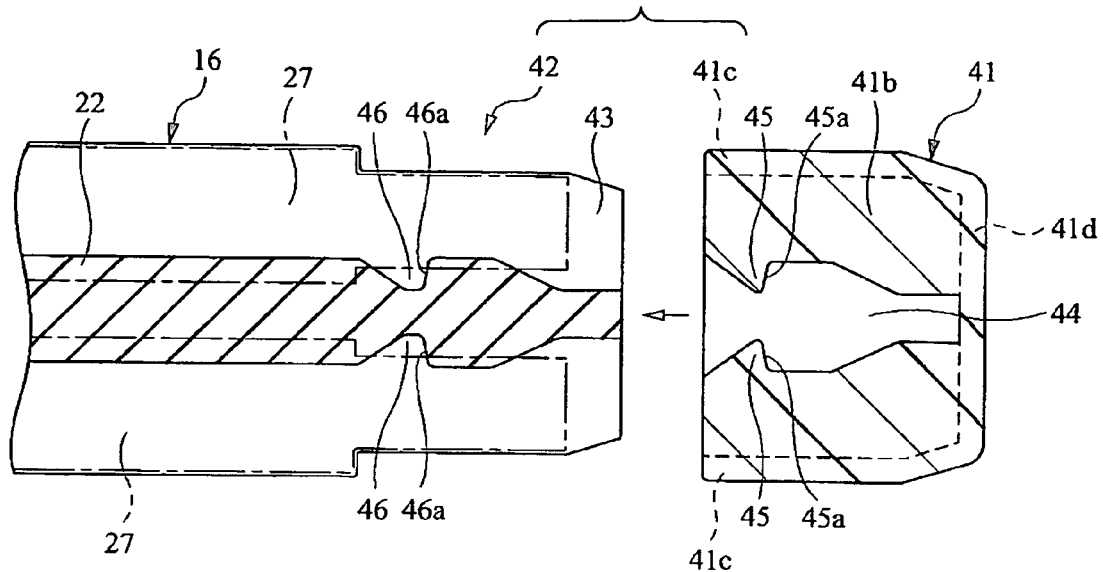
FIG. 9A is a cross-sectional view showing a detail of a engaging portion before the cap is attached to the blade rubber.
Figure 9B:
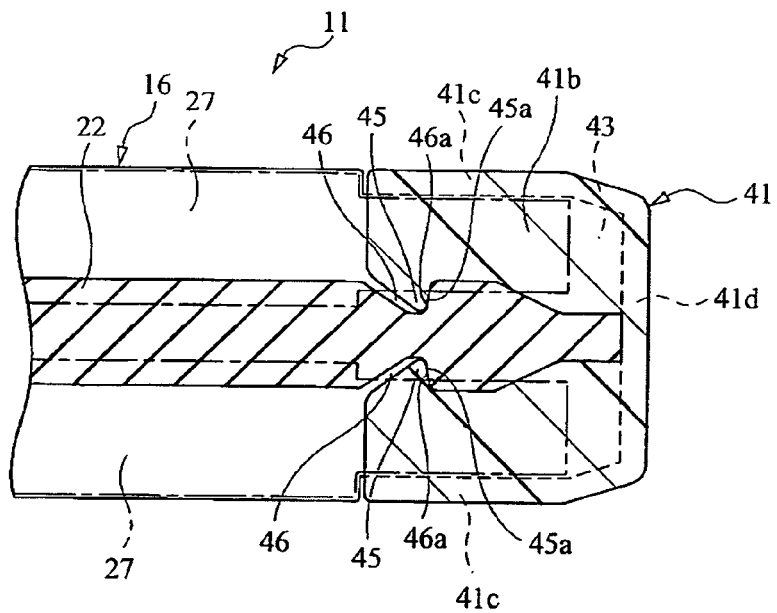
FIG. 9B is a cross-sectional view showing a detail of the engaging portion when the cap is mounted on the blade rubber.

FIG. 5 is a perspective view showing a detail of an end portion of the blade rubber shown in FIG. 1; FIG. 6 is a cross-sectional view taken along line A-A in FIG. 5; and FIG. 7 and FIG. 8 are each a broken perspective view showing a state where the cap shown in FIG. 5 is removed from the blade rubber. And, FIG. 9A is a cross-sectional view showing a detail of an engaging portion before the cap is mounted on the blade rubber; and FIG. 9B is a cross-sectional view showing a detail of an engaging portion when the cap is mounted on the blade rubber.

In the respective holding portions 31 and 32, the mounting grooves 25 of the head portion 21 is blocked by the side wall portions 15b of the rubber holder 15, whereby the respective blade spring members 27 mounted in the mounting grooves 25 are held in the mounting grooves 25. In addition to this, in this wiper blade 11, as shown in FIG. 5, a cap 41 is mounted on both ends in the longitudinal direction of the blade rubber 16 and, by this cap 41, both tip portions of the blade rubber 16 are covered and both tip portions in the longitudinal direction of the blade spring member 27 are held in the mounting grooves 25.

Incidentally, in the present embodiment, although the caps 41 are mounted on the both tip portions of the blade rubber 16, these caps 41 have the same structure. Accordingly, a description will be made only of the cap 41 on one side hereinafter.

As is known from FIG. 5 and FIG. 6, this cap 41 is made of a resin material and formed into a cap shape having a top wall portion 41a, a lower wall portion 41b, a pair of side wall portions 41c, and an end wall portion 41d, wherein they are mounted respectively on the both tip portions in the longitudinal direction of the head portion 21 of the blade rubber 16.

On the other hand, as shown in FIG. 7 and FIG. 8, the tip portion of the head portion 21 of the blade rubber 16 is provided with a mounting portion 42. A width dimension in the wiping direction of this mounting portion 42 is formed narrower than that of the main body portion of the head portion 21 and accordingly a width dimension of the tip portion of the blade spring member 27 is also formed narrow in the same manner as the mounting portion 42. Further, a portion on an upper side of the mounting grooves 25 of the head portion 21 is scraped in the mounting portion 42, so that the surface of the blade spring member 27 and a partition portion 26 that separates the mounting grooves 25 are exposed in the attaching portion 42. Further, an abutment portion 43 of a block shape that continues to the partition portion 26 and abuts on the tip portion of the blade spring member 27 is formed at the tip of the mounting portion 42 and, by this abutment portion 43, the mounting portion 42 is reinforced.

As shown in FIG. 8, in the lower wall portion 41b of the cap 41, an engaging groove 44 expanding from an opening side toward a side of the end wall portion 41d is formed. As shown in FIG. 9A, a pair of engaging protrusions 45 as engaging portions are formed in the lower wall portion 41b so as to make narrow the width of this engaging groove 44, and these engaging protrusions 45 each have a locking surface 45a perpendicular to the longitudinal direction of the blade rubber 16.

In contrast, as shown in FIG. 6, inside the holding groove 35 located at a portion corresponding to the mounting portion 42 of the blade rubber 16, a pair of concave grooves 46 as engaged portions are formed. As shown in FIG. 9A, the concave grooves 46 are each formed to be dented in the wiping direction of the blade rubber 16, and each have an engaged surface 46a perpendicular to the longitudinal direction of the blade rubber 16. Further, as shown in FIG. 6, the concave grooves 46 are formed to expand from a lower surface of the head portion 21 forming the holding groove 35 to the arm portion 34, that is, both end portions in a vertical direction thereof are blocked by the head portion 21 or the arm portion 34.

As shown in FIG. 9B, when the cap 41 is pressed from a tip portion side of the blade rubber 16 into the mounting portion 42 until the abutment portion 43 of the blade rubber 16 abuts on a bottom surface of the cap 41 (an inner surface of the end wall portion 41d), the locking surface 45a of the engaging protrusion 45 of the cap 41 and the engaged surface 46a of the concave groove 46 are engaged with each other, whereby a movement of the cap 41 in a direction of be detached from the mounting portion 42 is regulated. Further, as shown in FIG. 6, the mounting portion 42 is sandwiched between three pressing plates 41e provided in the inner surface of the top wall portion 41a and the lower wall portion 41b of the cap 41 and is also sandwiched between the both side wall portions 41c of the cap 41, whereby the cap 41 is fixed to the tip portion of the blade rubber 16.

When the cap 41 is mounted on the mounting portion 42, the tip portion of the blade spring member 27 mounted in each mounting groove 25 is sandwiched between the side wall portion 41c of the cap 41 and the partition portion 26 of the blade rubber 16 and is held in the mounting groove 25. Accordingly, the tip portion of the blade spring member 27 is securely held in the mounting groove 25 and is arranged in the inner surface (inside) of the cap 41, so that it is prevented from being detached from the mounting groove 25. Further, in this wiper blade 11, the concave groove 46 is formed to expand from the head portion 21 to the arm portion 34, so that even if the engaging protrusion 45 moves along the concave groove 46 due to any distortion occurring in the blade rubber 16, the movement is regulated by the head portion 21 or the arm portion 34 and the engaging protrusion 45 cannot be detached from the concave groove 46. Accordingly, it is possible to securely engage the engaging protrusion 45 to the concave groove 46 to prevent the cap 41 from being detached from the blade rubber 16.

As described above, in this wiper blade 11, the engaging protrusion 45 of the cap 41 is engaged with the concave groove 46 of the blade rubber 16 to fix the cap 41 to the blade rubber 16, so that even if any distortion occurs in the blade rubber 16 or the blade spring member 27 due to wiping resistance or the like, it is possible to securely engage the cap 41 to the blade rubber 16 to prevent the cap 41 from being detached from the blade rubber 16.

On the other hand, the thickness of the top wall portion 41a of the cap 41 is so formed as to match a difference in thickness dimension between the mounting portion 42 and the main body portion of the head portion 21, and the thickness of the side wall portion 41c is so formed as to match a step between the mounting portion 42 and the main body portion of the head portion 21. Therefore, an outer surface of the cap 41 mounted on the mounting portion 42 becomes in plane with both side surfaces and a top surface (surface directed to an opposite side to the windshield glass 13 of the head portion 21) in the wiping direction of the blade rubber 16. Accordingly, an outer shape of the cap 41 does not protrude from an outer shape of the blade rubber 16, and a sense of togetherness of the cap 41 and the blade rubber 16 is increased.

As described above, in this wiper blade 11, the outer surface of the cap 41 is in plane with the both side surfaces and the top surface of the blade rubber 16, so that it is possible to increase the sense of togetherness of the cap 41 and the blade rubber 16 to enhance the beautiful appearance of the wiper blade 11.

Further, in this wiper blade 11, the abutment portion 43 of a block shape is provided at the tip of the mounting portion 42, so that even if the width dimension or/and the thickness dimension of the mounting portion 42 is formed narrower than that of the main body portion of the head portion 21 so as to set the outer surfaces of the cap 41 and the blade rubber 16 in plane with each other, it is possible to reinforce the mounting portion 42 by this abutment portion 43 to prevent the tip portion of the blade rubber 16 from being damaged.

Figure 10:
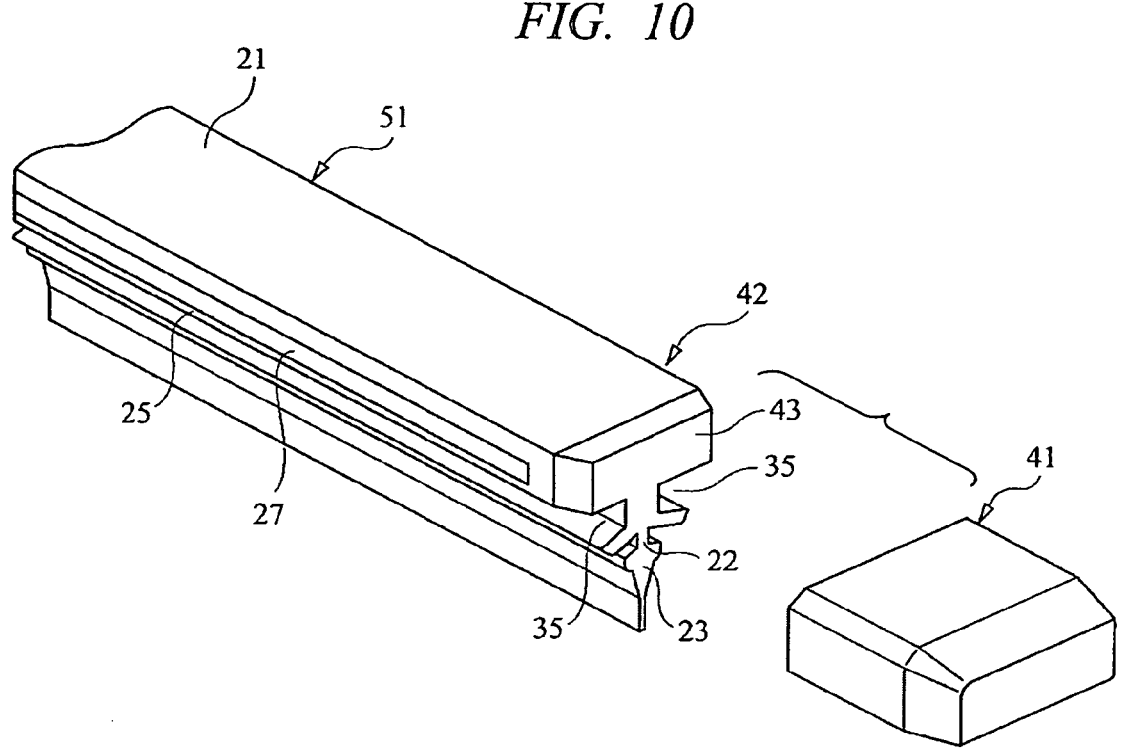
FIG. 10 is a perspective view showing a modified example of the blade rubber shown in FIG. 7.
Figure 11:
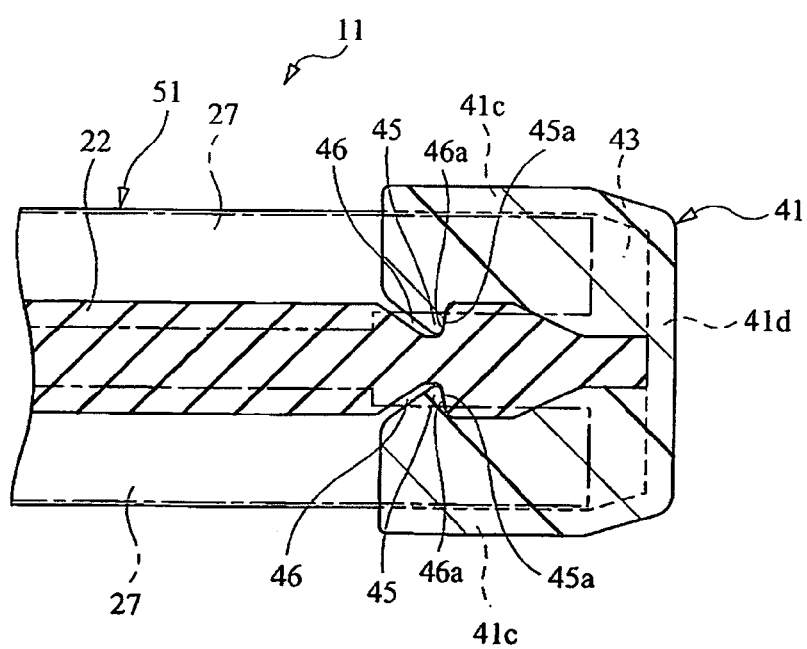
FIG. 11 is a cross-sectional view showing a detail of the engaging portion when the cap is mounted on the blade rubber shown in FIG. 10.

FIG. 10 is a perspective view showing a modified example of the blade rubber shown in FIG. 7; and FIG. 11 is a cross-sectional view showing a detail of the engaging portion when the cap is mounted on the blade rubber shown in FIG. 10.

In the blade rubber 16 shown in FIG. 7, the width dimension in the wiping direction of the mounting portion 42 to be provided at its tip portion is formed narrower than that of the main body portion of the head portion 21, and a portion on an upper side of the mounting grooves 25 of the head portion 21 is scraped. Therefore, the outer surface of the cap 41 is so formed as to be in plane with the top surface and the both side surfaces of the blade rubber 16, but the present invention is not limited to this and, as a blade rubber 51 shown in FIG. 10, the mounting portion 42 may be formed in such an outer shape as to make the head portion 21 extend as it is. In this case, as shown in FIG. 11, when the cap 41 is mounted on the blade rubber 51, the outer shape of the cap 41 becomes in a state of protruding from the outer shape of the blade rubber 51.

In this blade rubber 51, the width dimension of the mounting portion 42 is set to be identical to that of the head portion 21 and the portion on the upper side of the mounting grooves 25 is not scraped, and the entire tip portion of the mounting portion 42 serves as the abutment portion 43, so that a strength of the mounting portion 42 is further increased. Accordingly, when the cap 41 is detached from the blade rubber 51 for exchange or the like, it is possible to prevent the partition portion 26 or the like from being deformed due to friction with the cap 41 and to prevent the blade spring member 27 together with the cap 41 from being detached from the mounting groove 25.

Figure 12:
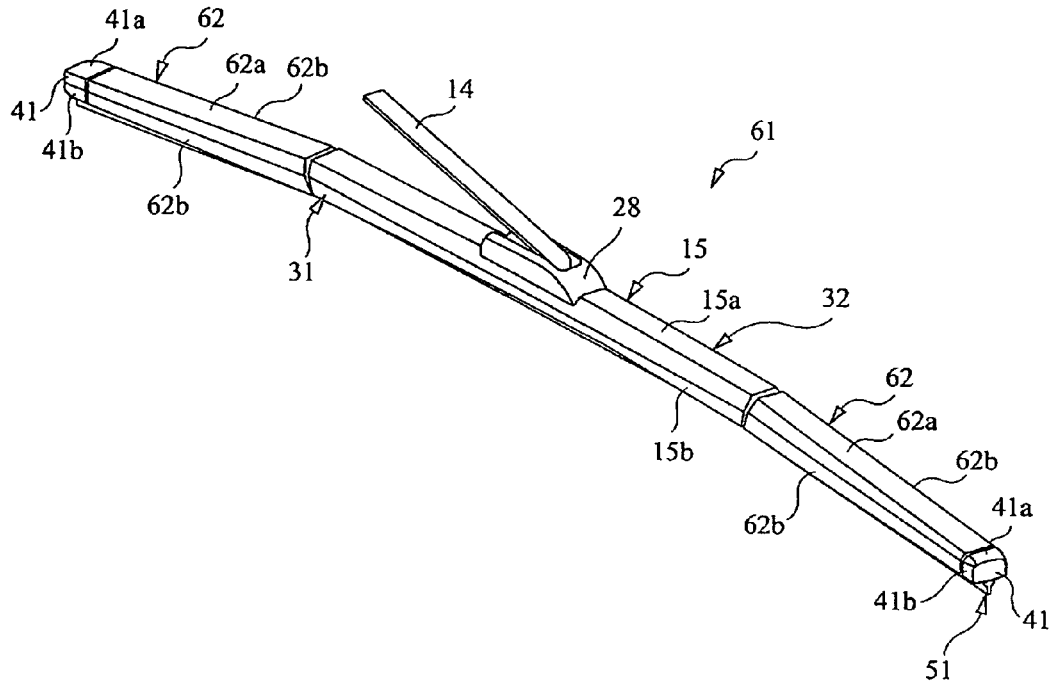
FIG. 12 is a perspective view showing a modified example of the wiper blade shown in FIG. 1.
Figure 13:
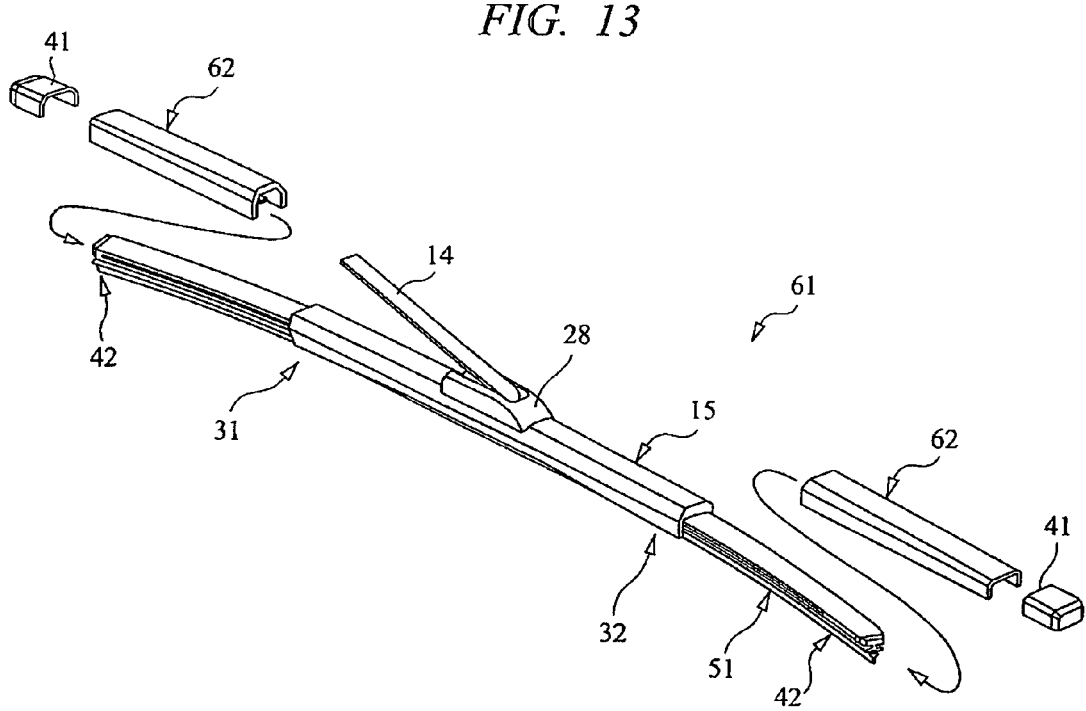
FIG. 13 is a broken perspective view showing the wiper blade shown in FIG. 12.

FIG. 12 is a perspective view showing a modified example of the wiper blade shown in FIG. 1; and FIG. 13 is a broken perspective view showing the wiper blade shown in FIG. 12.

In the case of using a blade rubber 51 as shown in FIG. 10, the outer shape of the cap 41 protrudes from the outer shape of the blade rubber 51. Therefore, in a wiper blade 61 shown in FIG. 12, a cover 62 is mounted between the rubber holder 15 and the cap 41 to improve the beautiful appearance of the wiper blade 61.

The cover 62 is formed into a U-shaped section having a top wall portion 62a and a pair of side wall portions 62b, wherein unshown holding claws similar to the rubber holders 15 are formed respectively in both end portions in a longitudinal direction thereof. And, since these holding claws are engaged with the holding grooves 35, the cover 62 is mounted on the blade rubber 51 in a state of being swingable in a direction perpendicular to the windshield glass 13 with respect to the rubber holder 15.

When the blade rubber 51 becomes in a state of contacting with the windshield glass 13, an outer surface of the top wall portion 62a of the cover 62 becomes in plane with the top wall portion 15a of the rubber holder 15 and the top wall portion 41a of the cap 41 and further the side wall portions 62b of the cover 62 become in plane with the side wall portions 15b and 41c of the respectively corresponding rubber holder 15 and cap 41. Accordingly, by mounting the cover 62 between the rubber holder 15 and the cap 41, it is possible to increase a sense of togetherness from the rubber holder 15 via the cover 62 to the cap 41 and improve the beautiful appearance of the wiper blade 61.

Figure 15:
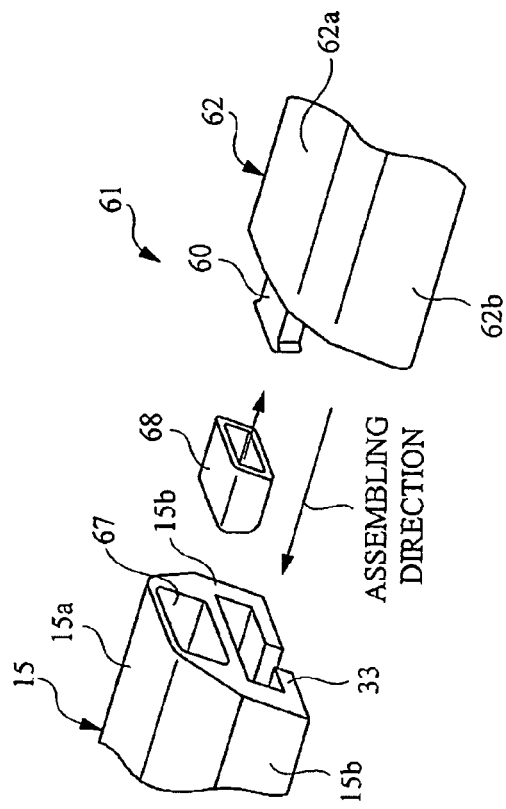
FIG. 15 is a broken perspective view showing a modified example of the connecting structure of the cover and the rubber holder shown in FIG. 12.
Figure 16:
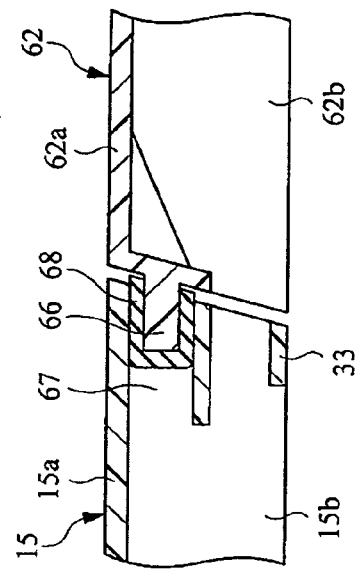
FIG. 16 is a cross-sectional view showing a state of linking the cover shown in FIG. 15 to the rubber holder.
Figure 14:
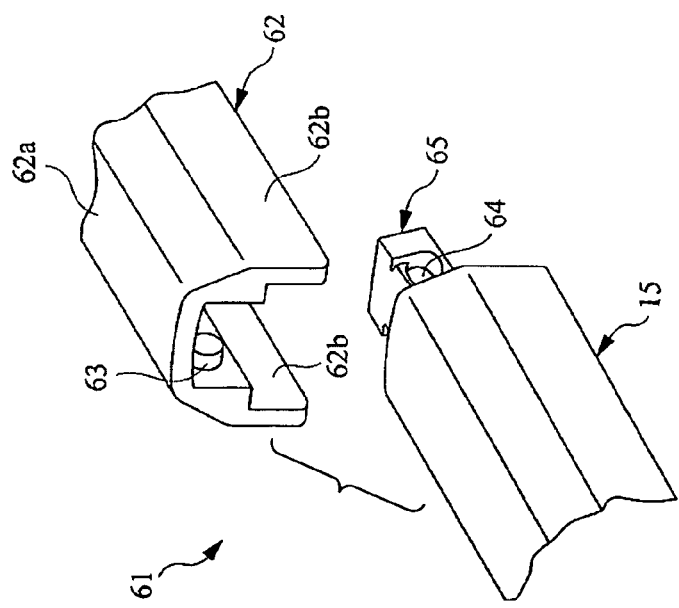
FIG. 14 is a broken perspective view showing a modified example of a connecting structure of a cover and the rubber holder shown in FIG. 12.
Figure 17:
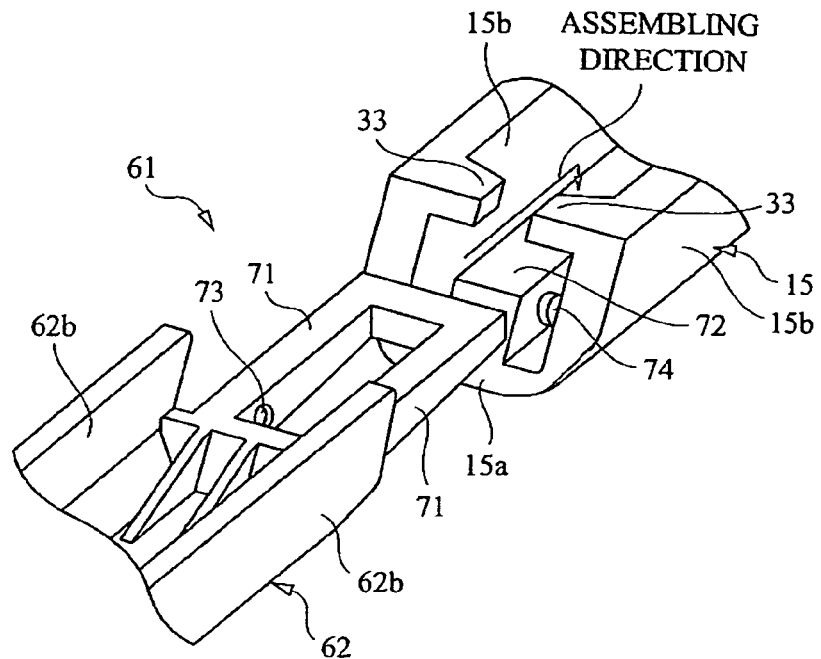
FIG. 17 is a broken perspective view showing a modified example of the connecting structure of the cover and the rubber holder shown in FIG. 12.
Figure 18:
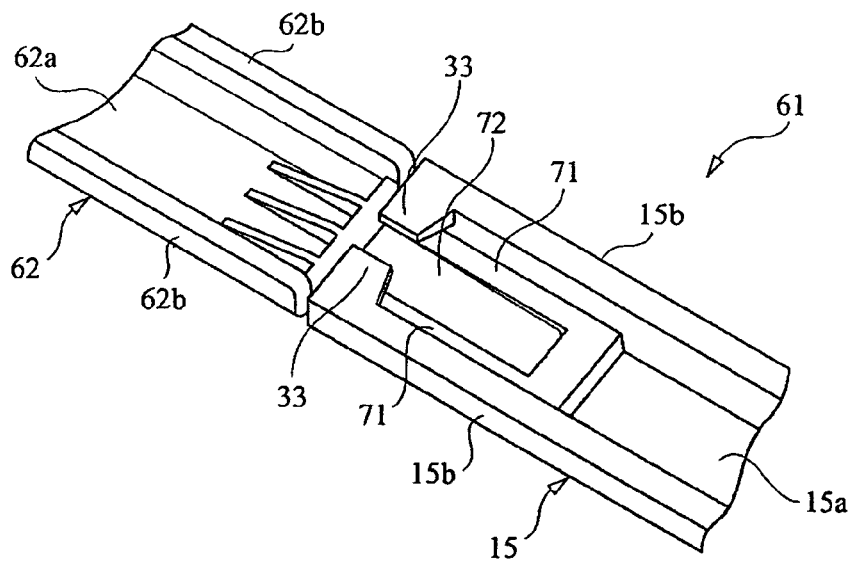
FIG. 18 is a perspective view showing a state of linking the cover shown in FIG. 17 to the rubber holder.
Figure 19:
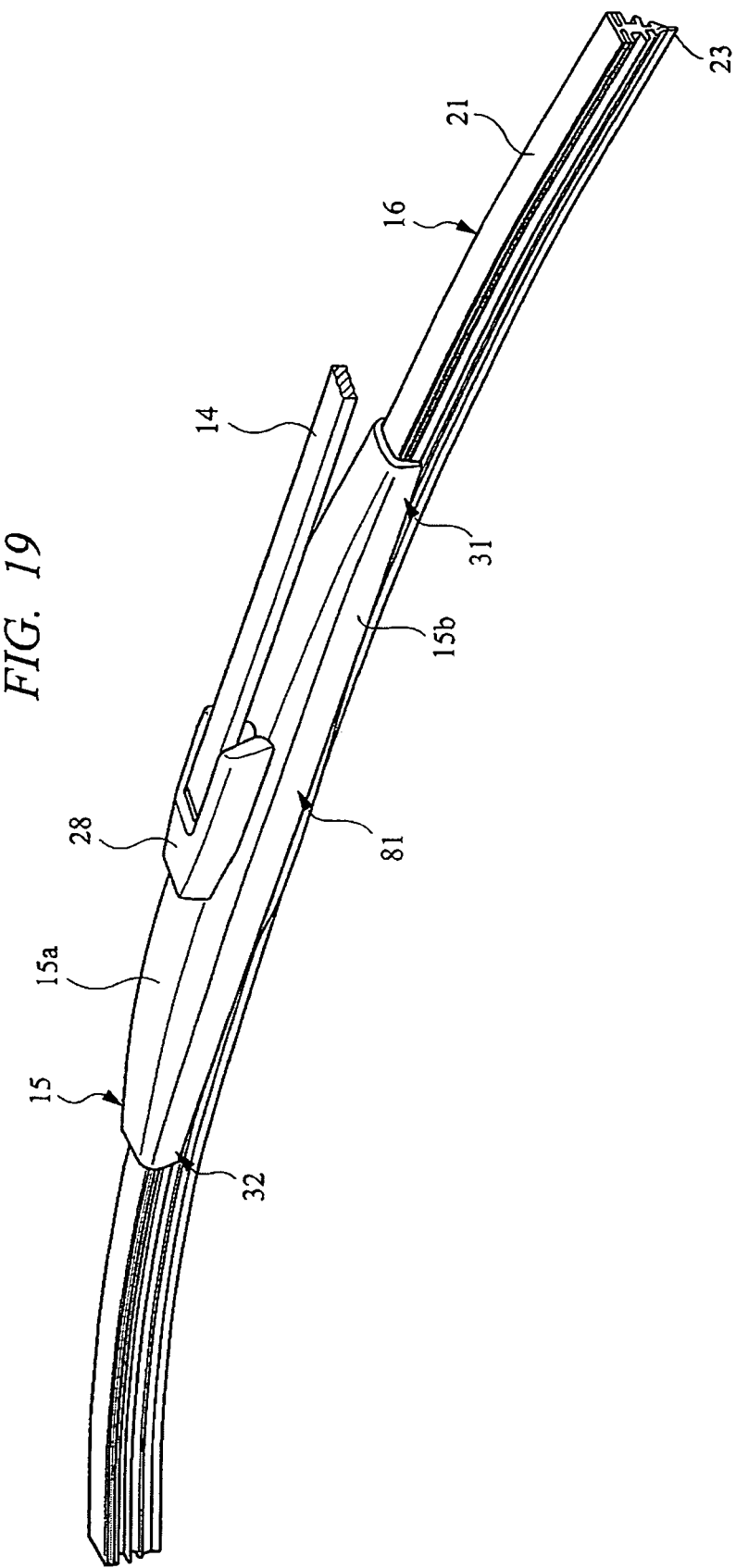
FIG. 19 is a perspective view showing a modified example of the wiper blade shown in FIG. 1.
Figure 20:
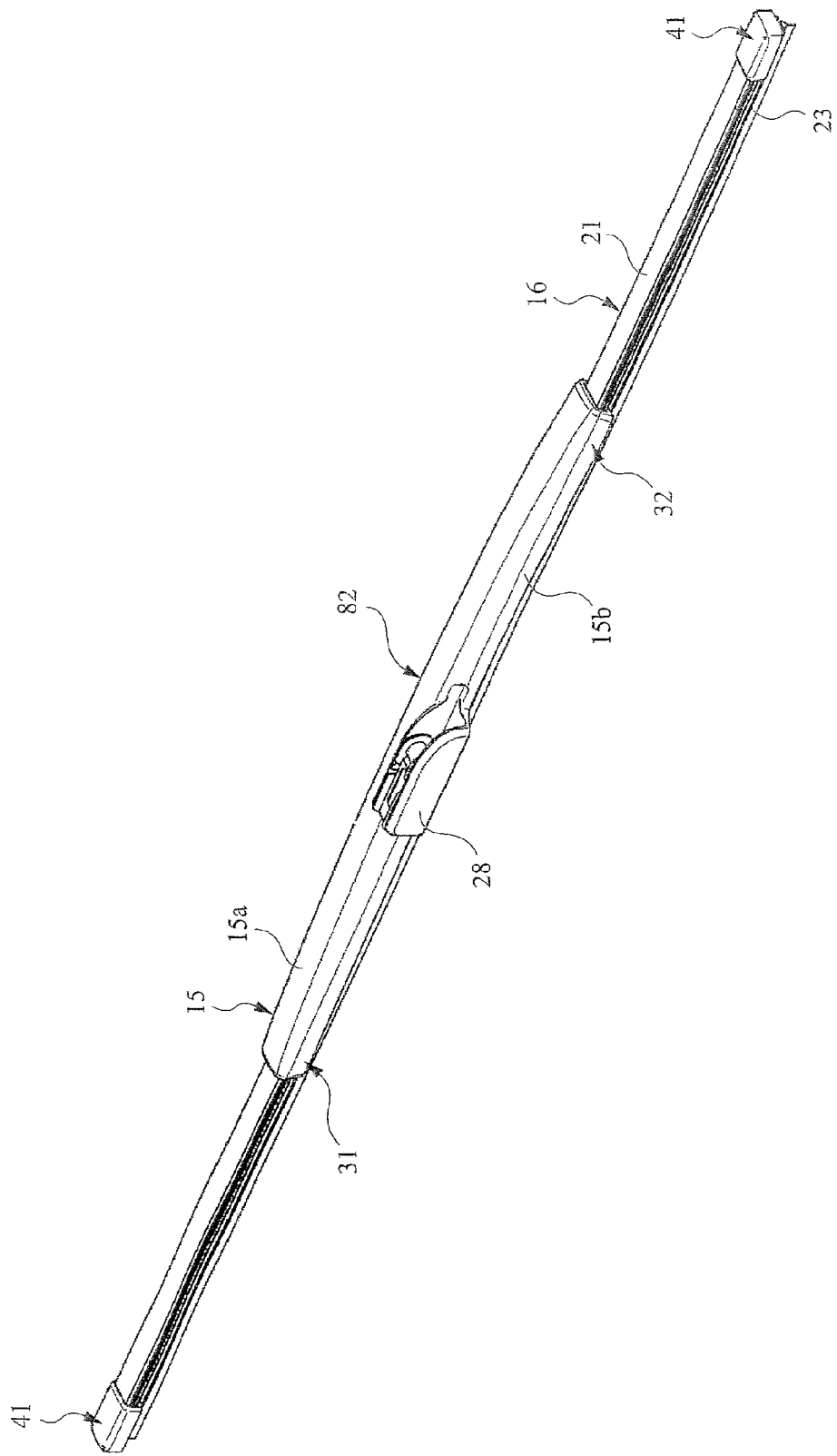
FIG. 20 is a perspective view showing a modified example of the wiper blade shown in FIG. 1.

Incidentally, a method of mounting the cover 62 is not limited to a structure of engaging the holding claws with the holding grooves 35 and, for example as shown in FIG. 14, may have a structure in which, in the place of the holding claws, a protruding portion 63 that protrudes from an inner surface of the side wall portion 62b is provided to one end located on a side of the rubber holder of the cover 62; an engaging boss 65 equipped with an engaging concave portion 64 is provided to the end portion of the rubber holder 15; and the cover 62 is rotatably linked to the rubber holder 15 by engaging the protruding portion 63 with the engaging concave portion 64. Further, as shown in FIG. 15 and FIG. 16, in the place of the holding claws, an engaging protrusion 66 is provided to one end located on a side of the rubber holder 15 of the cover 62, an engaging hole 67 that opens toward the cover 62 is provided to the end of the rubber holder 15, and the engaging protrusion 66 is engaged with the engaging hole 67 in a state of mounting a rubber cover 68 thereon, whereby the cover 62 may rotatably be linked to the rubber holder 15. Furthermore, as shown in FIG. 17 and FIG. 18, in the place of the holding claws, a pair of foot portions 71 are provided to one end located on a side of the rubber holder 15 of the cover 62, an engaging piece 72 that protrudes from the top wall portion 15a toward the windshield glass 13 is provided to the end of the rubber holder 15, the foot portions 71 are arranged between the engaging piece 72 and the side wall portions 15b, and an engaging concave portion 73 provided in the foot portion 71 (although only one foot portion 71 is illustrated in the drawings, the same engaging concave portion 73 is provided also in the other foot portion 71) is engaged with a protruding portion 74 provided in the engaging piece 72 (although only one side thereof is illustrated in the drawings, the same protruding portion 74 is provided also on the other side), whereby the cover 62 may be rotatably linked to the rubber holder 15.

FIG. 19 through FIG. 22 are each a perspective view showing a modified example of the wiper blade shown in FIG. 1.

In the wiper blade 11 shown in FIG. 1, the blade spring member 27 in which the cap 41 is mounted on the both tip portions in the longitudinal direction of the blade rubber 16 thereof is held in the mounting grooves 25. However, the present invention is not limited to this and, like a wiper blade 81 shown in FIG. 19, may have a structure in which the cap is not provided to the both tip portions of the blade rubber 16. In this case, the blade spring member 27 may be held in the mounting grooves 25 by a clip, adhesion or the like.

Further, in the wiper blade 11 shown in FIG. 1, the substantially intermediate portion in the longitudinal direction of the top wall portion 15a of the rubber holder 15 is provided with the attaching portion 28, and the wiper blade 11 is attached to the wiper arm 14 by this attaching portion 28. However, the present invention is not limited to this and, for example like a wiper blade 82 shown in FIG. 20, the attaching portion 28 may be provided to any one of the side wall portions 15b of the rubber holder 15.

Furthermore, like a wiper blade 83 shown in FIG. 21, the rubber holder 15 may be provided with a fin 84 for preventing the wiper blade 11 from floating up during high-speed driving of the vehicle 12. Conventionally, in a wiper blade in which the blade spring member is mounted on the blade rubber, the fin for preventing the floating has been formed integrally with the blade spring member. However, like the wiper blade 83 shown in FIG. 21, since the fin 84 is provided to the rubber holder 15 necessary for a linkage with the wiper arm 14, it is possible to provide the fin 84 so as to protrude in the wiping direction, keep thin the thickness in a glass-surface disjunction direction of the blade rubber 16, and attain an excellent design property. Herein, since the rubber holder 15 is formed integrally by using a resin material or the like, it is possible to easily form the fin 84 and also cope with various shapes according to specifications thereof.

Moreover, in a natural state of separating the blade rubber 16 from the glass surface due to a biasing force of a blade spring member (as not shown) installed therein, this wiper blade 83 is formed into such an M shape that the intermediate portion in the longitudinal direction is curved on a side of the glass surface. Also in this case, it is possible, by liking the rubber holder 15 and the blade rubber 16 via the holding portions 31 and 32 in the same manner as in the previously described respective embodiments, and by forming the blade rubber 16 into the M shape, to further improve the adhesion property with respect to the windshield glass 13 of the blade rubber 16 and obtain the wiper blade 83 with excellent wiping performance.

Still further, such a wiper blade 85 as shown in FIG. 22 may be structured. This has a structure in which the blade rubber 16 of such an M shape as used in the wiper blade 83 shown in FIG. 21 is linked to the rubber holder 15 having the same structure as that of the wiper blade 11 shown in FIG. 1. Also by doing so, it is possible to obtain the wiper blade 85 having further improved adhesion property with respect to the windshield glass of the blade rubber 16.

Incidentally, in FIG. 10 through FIG. 22, the same reference numeral is denoted to members corresponding to the members described previously.

The present invention is not limited to the above embodiments and, needless to say, may be variously modified within a scope of not departing from the gist thereof. For example, in the present embodiments, although the wiper blade 11 is one to wipe the front windshield glass 13 of the vehicle 12, the present invention is not limited to this and may wipe a rear windshield glass and the like of the vehicle 12.

Further, in the present embodiments, although the rubber holder 15 of a 2-point supporting type equipped with a pair of holding portions 31 and 32 at both ends is employed, the present invention is not limited to this and may use, for example, a type of holding the intermediate portion of the blade spring member 27 to hold the blade rubber 16 via the blade spring member 27, a tournament type of building up a plurality of levers, or the like.

Furthermore, in the present embodiments, the engaging protrusions 45 are provided in the cap 41, and the concave grooves 46 engaged with the engaging protrusions 45 are provided in the blade rubber 16. However, the present invention is not limited to this, and may be such that the concave grooves 46 are provided in the cap 41 and the engaging protrusions 45 is provided in the blade rubber 16.

Moreover, in the present embodiments, although the respective holding claws 33 and 37 are formed into rectangular sections, the present invention is not limited to this and may have other shapes such as a cylindrical shape, a cylindroid shape or the like so long as the other shapes are such shapes as to protrude from the side wall portion 15b of the rubber holder 15 and be disposed inside the holding grooves 35.

Still further, the present invention may be applied to wiper blades used in various types of wipers including tandem types, opposed wiping types and the like.

INDUSTRIAL APPLICABILITY

The present invention may be applied in manufacturing the wiper blade for wiping the windshield glass of the vehicle.

The invention claimed is:

1. A wiper blade for wiping a windshield glass of a vehicle, the wiper blade comprising:
   a blade rubber having a lip portion that wipes a surface of the windshield glass, a head portion in which a pair of mounting grooves are formed and that is linked to the lip portion via a neck portion, and a pair of holding grooves that are provided between the lip portion and the head portion and each of which is provided a stopper portion, the head portion having a left side portion and a right side portion;
   a pair of blade spring members that have elasticity and are respectively mounted in the mounting grooves of the blade rubber; and
   a rubber holder that has a pair of side wall portions which at least covers the pair of the blade spring members and a top wall portion linked mutually to the side wall portions, and holds the blade rubber by a pair of holding portions that is provided at both ends in the longitudinal direction of the rubber holder and have a pair of holding claws provided respectively in the side wall portions and disposed in the holding grooves,
   wherein an axial length of the rubber holder is formed so as to be shorter than that of the blade rubber, both side portions in a wiping direction of the head portion are covered with the pair of side wall portions and the top wall portion in the longitudinal direction when the entire lip portion in the longitudinal direction contacts the windshield glass, the pair of holding claws of one of the holding portions are disposed in the pair of stopper portions, respectively, and the pair of holding claws of the other of the holding portions are movably disposed in the longitudinal direction in the holding grooves, and the blade rubber is elastically deformable between the pair of the holding portions in a direction perpendicular to the windshield glass, wherein the blade rubber is configured to deform into an M shape as the wiper blade is set to the windshield glass.

2. The wiper blade according to claim 1, further comprising:
   caps mounted respectively on both tip portions in a longitudinal direction of the blade rubber and holding in the mounting grooves both tip portions in a longitudinal direction of the pair of blade spring members,
   wherein engaging portions of the caps are engaged with engaged portions formed in the holding grooves of the blade rubber to fix the caps to the blade rubber.

3. The wiper blade according to claim 1, further comprising an intermediate portion of the head portion of the blade rubber is surrounded by the rubber holder.

4. A wiper blade for wiping a windshield glass of a vehicle, the wiper blade comprising:
    a blade rubber having a lip portion that wipes a surface of the windshield glass, a head portion in which a pair of mounting grooves are formed and that is linked to the lip portion via a neck portion, and a pair of holding grooves that are provided between the lip portion and the head portion and each of which is provided a stopper portion, the head portion having a left side portion and a right side portion;
    a pair of blade spring members that have elasticity and are respectively mounted in the mounting grooves of the blade rubber; and
    a rubber holder that has a pair of side wall portions which at least covers the pair of the blade spring members and a top wall portion linked mutually to the side wall portions, and holds the blade rubber by a pair of holding portions that is provided at both ends in the longitudinal direction of the rubber holder and have a pair of holding claws provided respectively in the side wall portions and disposed in the holding grooves,
    wherein an axial length of the rubber holder is formed so as to be shorter than that of the blade rubber, both side portions in a wiping direction of the head portion are covered with the pair of side wall portions and the top wall portion in the longitudinal direction when the entire lip portion in the longitudinal direction contacts the windshield glass, the respective stopper portions are formed by a pair of convex portions that protrude in the holding grooves, and the pair of holding claws of one of the holding portions are disposed between the pair of convex portions of the respective corresponding stopper portions, and the pair of holding claws of the other of the holding portions are movably disposed in the longitudinal direction in the holding grooves, and the blade rubber is elastically deformable between the pair of the holding portions in a direction perpendicular to the windshield glass, wherein the blade rubber is configured to deform into an M shape as the wiper blade is set to the windshield glass.

5. The wiper blade according to claim 4, further comprising:
    caps mounted respectively on both tip portions in a longitudinal direction of the blade rubber and holding in the mounting grooves both tip portions in a longitudinal direction of the pair of blade spring members,
    wherein engaging portions of the caps are engaged with engaged portions formed in the holding grooves of the blade rubber to fix the caps to the blade rubber.

6. The wiper blade according to claim 4, further comprising an intermediate portion of the head portion of the blade rubber is surrounded by the rubber holder.

7. A wiper blade for wiping a windshield glass of a vehicle, the wiper blade comprising:
    a blade rubber having a lip portion that wipes a surface of the windshield glass, a head portion in which a pair of mounting grooves are formed and that is linked to the lip portion via a neck portion, and a pair of holding grooves that are provided between the lip portion and the head portion and each of which is provided a stopper portion, the head portion having a left side portion and a right side portion;
    a pair of blade spring members that have elasticity and are respectively mounted in the mounting grooves of the blade rubber; and
    a rubber holder that is formed into a U-shaped section having a pair of side wall portions which at least covers the pair of the blade spring members and a top wall portion linked mutually to the side wall portions, and holds the blade rubber by a pair of holding portions that is provided at both ends in the longitudinal direction of the rubber holder and have a pair of holding claws provided respectively in the side wall portions and disposed in the holding grooves,
    wherein an axial length of the rubber holder is formed so as to be shorter than that of the blade rubber, both side portions in a wiping direction of the head portion are covered with the pair of side wall portions and the top wall portion in the longitudinal direction when the entire lip portion in the longitudinal direction contacts the windshield glass, the pair of holding claws of one of the holding portions are disposed in the pair of stopper portions, respectively, and the pair of holding claws of the other of the holding portions are movably disposed in the longitudinal direction in the holding grooves, and the blade rubber is elastically deformable between the pair of the holding portions in a direction perpendicular to the windshield glass, wherein the blade rubber is configured to deform into an M shape as the wiper blade is set to the windshield glass.

8. The wiper blade according to claim 7, further comprising:
    caps mounted respectively on both tip portions in a longitudinal direction of the blade rubber and holding in the mounting grooves both tip portions in a longitudinal direction of the pair of blade spring members,
    wherein engaging portions of the caps are engaged with engaged portions formed in the holding grooves of the blade rubber to fix the caps to the blade rubber.

9. The wiper blade according to claim 7, further comprising an intermediate portion of the head portion of the blade rubber is surrounded by the rubber holder.

10. A wiper blade for wiping a windshield glass of a vehicle, the wiper blade comprising:
    a blade rubber having a lip portion that wipes a surface of the windshield glass, a head portion in which a pair of mounting grooves are formed and that is linked to the lip portion via a neck portion, and a pair of holding grooves that are provided between the lip portion and the head portion and each of which is provided a stopper portion, the head portion having a left side portion and a right side portion;
    a pair of blade spring members that have elasticity and are respectively mounted in the mounting grooves of the blade rubber;
    a rubber holder that has a pair of side wall portions which at least covers the pair of the blade spring members and a top wall portion linked mutually to the side wall portions and an axial length of which is formed shorter than that of the blade rubber;
    first connecting means that is provided at one end in the longitudinal direction of the rubber holder and has a pair of first holding claws provided respectively to the side wall portions and which links the blade rubber and the rubber holder by the first holding claws being disposed in the stopper portions; and
    second connecting means that is provided at the other end in the longitudinal direction of the rubber holder and has a pair of second holding claws provided respectively to the side wall portions and which links the blade rubber and the rubber holder by the second holding claws being disposed in the holding grooves, and wherein both side portions in a wiping direction of the head portion are covered with the pair of side wall portions and the top wall portion in the longitudinal direction when the entire lip portion in the longitudinal direction contacts the windshield glass, and the blade rubber is elastically deformable between the first and second connecting means in a direction perpendicular to the windshield glass, wherein the blade rubber is configured to deform into an M shape as the wiper blade is set to the windshield glass.

11. The wiper blade according to claim 10, further comprising:

caps mounted respectively on both tip portions in a longitudinal direction of the blade rubber and holding in the mounting grooves both tip portions in a longitudinal direction of the pair of blade spring members, wherein engaging portions of the caps are engaged with engaged portions formed in the holding grooves of the blade rubber to fix the caps to the blade rubber.

12. The wiper blade according to claim 10, further comprising an intermediate portion of the head portion of the blade rubber is surrounded by the rubber holder.

* * * * *